(12) United States Patent
Hara

(10) Patent No.: US 6,173,086 B1
(45) Date of Patent: *Jan. 9, 2001

(54) IMAGE PROCESSING METHOD

(75) Inventor: Shoji Hara, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/892,970

(22) Filed: Jul. 15, 1997

(30) Foreign Application Priority Data

Jul. 18, 1996 (JP) .................................. 8-189186

(51) Int. Cl.[7] ...................................... G06K 9/36
(52) U.S. Cl. ...................... 382/276; 382/128; 382/232
(58) Field of Search .................... 382/276, 132, 382/128, 166, 232, 239, 251, 264, 207

(56) References Cited

U.S. PATENT DOCUMENTS

| 4,258,264 |   | 3/1981  | Kotera et al. ............... 250/484 |
|-----------|---|---------|---------------------------------------|
| 5,253,530 | * | 10/1993 | Letcher, III ................. 73/602 |
| 5,420,636 | * | 5/1995  | Kojima ........................ 348/403 |
| 5,467,404 | * | 11/1995 | Vuylsteke et al. .............. 382/274 |
| 5,474,813 | * | 12/1995 | Walker et al. ................ 427/510 |
| 5,513,273 | * | 4/1996  | Ito ............................ 382/132 |
| 5,604,824 | * | 2/1997  | Chui et al. ................... 382/248 |
| 5,745,392 | * | 4/1998  | Ergas et al. ................ 364/715.02 |
| 5,799,100 | * | 8/1998  | Clarke et al. ................ 382/132 |
| 5,881,162 | * | 3/1999  | Ishimitsu ..................... 382/132 |
| 5,901,249 | * | 5/1999  | Ito ............................ 382/239 |

FOREIGN PATENT DOCUMENTS

| 2088311   | * | 4/1990  | (JP) . |
|-----------|---|---------|--------|
| 6-350990  |   | 12/1994 | (JP) .............. H04N/7/133 |
| 7-23228   |   | 1/1995  | (JP) .............. H04N/1/41 |
| 7-23229   |   | 1/1995  | (JP) .............. H04N/1/41 |

OTHER PUBLICATIONS

"Image Coding Using Wavelet Transform", Marc Antonini et al, IEEE Transactions on Image Processing, vol. 1, No. 2, pp. 205–220, Apr. 1992.

* cited by examiner

Primary Examiner—Bhavesh Mehta
Assistant Examiner—Kanji Patel
(74) Attorney, Agent, or Firm—Sughrue, Mion, Zinn, Macpeak & Seas, PLLC

(57) ABSTRACT

A wavelet transform is carried out on an image signal representing an image, in which periodical structure patterns corresponding to a frequency higher than a Nyquist frequency in sub-sampling effected with the wavelet transform are embedded, by using at least one kind of low pass filter capable of decreasing the frequency components of the image signal, which correspond to the periodical structure patterns. A reduced image, which is represented by low frequency components of the image signal, is thereby obtained from the wavelet transform such that no moire may occur in the reduced image. The reduced image thus having good image quality is utilized as an image to be viewed.

6 Claims, 3 Drawing Sheets

IMAGE PROCESSING METHOD

BACKGROUND OF THE INVENTION

1. Field of the Invention

This invention relates to an image processing method. This invention particularly relates to characteristics of a filter used in a wavelet transform carried out on an image signal representing an image, in which periodical structure patterns are embedded.

2. Description of the Prior Art

A wavelet transform is one of techniques for signal frequency analysis. The wavelet transform is advantageous over a Fourier transform, which has heretofore been used widely as the frequency analysis technique, in that a local change in a signal can be detected easily. Therefore, recently, the wavelet transform has attracted particular attention in the field of signal processing.

In the field of signal processing, processing is often carried out on an image signal such that different processes may be carried out for different frequency bands. In such cases, the wavelet transform is employed as means for classifying the image signal into signals falling within different frequency bands. Specifically, for example, the processes include a process for eliminating noise by separating high frequency components and a process for compressing an image signal by reducing the information of a frequency band, in which much noise is contained. The applicant proposed various image signal compressing methods, which are based upon a technique proposed in "Image Coding Using Wavelet Transform" by Marc Antonini, et al., IEEE Transactions on Image Processing, Vol. 1, No. 2, pp. 205–220, April 1992. In the proposed image signal compressing methods, the wavelet transform is carried out in order for different compressing processes to be carried out for different frequency bands. (The image signal compressing methods are proposed in, for example, U.S. Ser. No. 08/253,857; U.S. Ser. No. 08/303,198, and Japanese Unexamined Patent Publication Nos. 6(1994)-350990, 7(1995)-23228 and 7(1995)-23229. In such image processing, the signals having been obtained from the wavelet transform are subjected to different processes for different frequency bands, and the processed signals are then subjected to inverse wavelet transform. An image obtained from the inverse wavelet transform is utilized as the product of the image processing.

In cases where an X-ray image of an object is recorded on a recording medium, such that the image quality may be prevented from becoming bad due to scattered X-rays impinging upon the recording medium, a technique is often employed wherein a stationary grid having a predetermined grid pitch is located between the object and the recording medium and wherein the X-ray image of the object is thereby recorded on the recording medium. Heretofore, the wavelet transform has also been carried out on a radiation image, which has been recorded in such a manner, in order for the image quality to be kept high or in order for the image signal to be compressed for the purposes of signal transmission or signal storage. In such cases, heretofore, an image obtained ultimately from the inverse wavelet transform, which image has the same size as the size of the original image, has been reproduced, primarily on photographic film, and viewed.

An image signal falling within a low frequency band, which image signal is obtained from the wavelet transform carried out on an original image signal, represents an image having a reduced size and having a resolution lower than the resolution of the original image. In the conventional techniques for processing radiation images, the image to be viewed is the one which is obtained from the inverse wavelet transform, and the reduced image, which is obtained as an intermediate product from the wavelet transform, is not utilized. Therefore, no problem has occurred with regard to the image quality of the reduced image.

In image processing systems, it is often desired that an image subjected to processing can be checked on a cathode ray tube (CRT) display device, or the like. In such cases, ordinarily, the original image signal is subjected to a filtering process, and the level of resolution of the image is thereby decreased to a level appropriate for the level of resolution on the CRT display device, or the like. Therefore, in cases where the image processing systems have the characteristics such that the wavelet transform may be carried out on the image signal, the reduced image obtained as the intermediate product in the wavelet transform can be utilized as the image to be displayed on the CRT display device, or the like.

However, the reduced image having a low resolution, which is obtained from the wavelet transform, is the image obtained by carrying out sub-sampling at predetermined sampling intervals on the original image signal. Therefore, in cases where the reduced image is an image in which periodical structure patterns, such as the patterns of the stationary grid, are embedded, and the frequency corresponding to the periodical structure patterns is higher than the Nyquist frequency in the sub-sampling, moire due to the sub-sampling occurs in the displayed image. As a result, the image quality of the image displayed on the CRT display device cannot be kept good.

SUMMARY OF THE INVENTION

The primary object of the present invention is to provide an image processing method, wherein a reduced image free from moire and having good image quality is obtained even from a wavelet transform carried out on an original image signal representing an original image, in which periodical structure patterns are embedded.

Another object of the present invention is to provide an image processing method, which enables efficient utilization of a reduced image obtained from a wavelet transform.

The present invention provides an image processing method for carrying out a wavelet transform on an image signal, and thereby obtaining a reduced image to be viewed, which is represented by low frequency components of the image signal, the low frequency components being obtained from sub-sampling, which is carried out on the image signal at predetermined sub-sampling intervals, wherein the wavelet transform is carried out on an image signal representing an image, in which periodical structure patterns corresponding to a frequency higher than a Nyquist frequency in the sub-sampling are embedded, by using at least one kind of low pass filter capable of decreasing the frequency components of the image signal, which correspond to the periodical structure patterns.

Examples of the image, in which the periodical structure patterns are embedded, include a radiation image having been recorded by locating a stationary grid between an object and a recording medium, a photograph taken via wire netting, and a photograph of an object having a stripe pattern.

In cases where the frequency of the sub-sampling is represented by N (i.e., the predetermined sub-sampling intervals are equal to 1/N), the Nyquist frequency is equal to N/2. The Nyquist frequency is defined by the sampling theorem. The term "sub-sampling" as used herein means the sampling of a digital signal, which has been sampled from an analog signal.

In cases where only one kind of low pass filter is used in the filtering for obtaining the reduced image, the term "at least one kind of lowpass filter" as used herein means the low pass filter used in the filtering. In cases where the reduced image is obtained by carrying the wavelet transform in several steps and by using several kinds of low pass filters, the term "at least one kind of low pass filter" as used herein means at least one kind of low pass filter among the several kinds of low pass filters.

Further, the term "image processing for obtaining a reduced image to be viewed" as used herein is not limited to the image processing, which aims at obtaining a reduced image to be viewed, and means every kind of image processing, in which it is possible that a reduced image obtained during the processing will be viewed. Therefore, for example, the image processing for obtaining a reduced image to be viewed may be the processing for classifying an image signal into different frequency bands with the wavelet transform, carrying out quantization such that the amount of information of high frequency components containing much noise may become small, and thereby compressing the image signal, wherein a reduced image, which is formed during the processing, is to be viewed for confirmation. The term "viewing" as used here in means that a reduced image is displayed on a CRT display device, or the like.

As for the theory of the wavelet transform, the design of filters in accordance with a wavelet function, and the filtering process with the designed filters, reference may be made to various publications cited above.

With the image processing method in accordance with the present invention, in cases where the wavelet transform is carried out on an image signal representing an image, in which periodical structure patterns are embedded, and a reduced image is thereby obtained, at least one kind of low pass filter capable of decreasing the frequency components of the image signal, which correspond to the periodical structure patterns, is used as the low pass filter for the wavelet transform, such that the frequency components corresponding to the periodical structure patterns may not be contained in the reduced image. Therefore, moire can be prevented from occurring in the reduced image, and a reduced image to be viewed, which has good image quality, can be obtained.

The image processing method in accordance with the present invention is applicable to every kind of image, in which periodical structure patterns are embedded, such as a radiation image having been recorded by locating a stationary grid between an object and a recording medium. Also, the image processing method in accordance with the present invention is efficient when a reduced image is to be utilized in every kind of image processing, such as an image signal compressing process in which the wavelet transform is utilized.

DESCRIPTION OF THE PREFERRED EMBODIMENTS

The present invention will hereinbelow be described in further detail with reference to the accompanying drawings.

Embodiments of the image processing method in accordance with the present invention, which are described below, relate to a radiation image recording and reproducing system, which is proposed in, for example, U.S. Pat. No. 4,258,264. In the radiation image recording and reproducing system, a radiation image of an object, such as a human body, is recorded on a stimulable phosphor sheet. The stimulable phosphor sheet, on which the radiation image has been recorded, is exposed to stimulating rays, such as a laser beam, which cause the stimulable phosphor sheet to emit light in proportion to the amount of energy stored thereon during its exposure to radiation. The emitted light is photoelectrically detected, and a digital image signal representing the radiation image is obtained. The image signal is subjected to various kinds of image processing, and the processed image signal is used in reproduction of a visible image or stored. As one kind of image processing, an image signal compressing process utilizing a wavelet transform as described in, for example, U.S. Ser. No. 08/253,857, is carried out.

Figure 1:
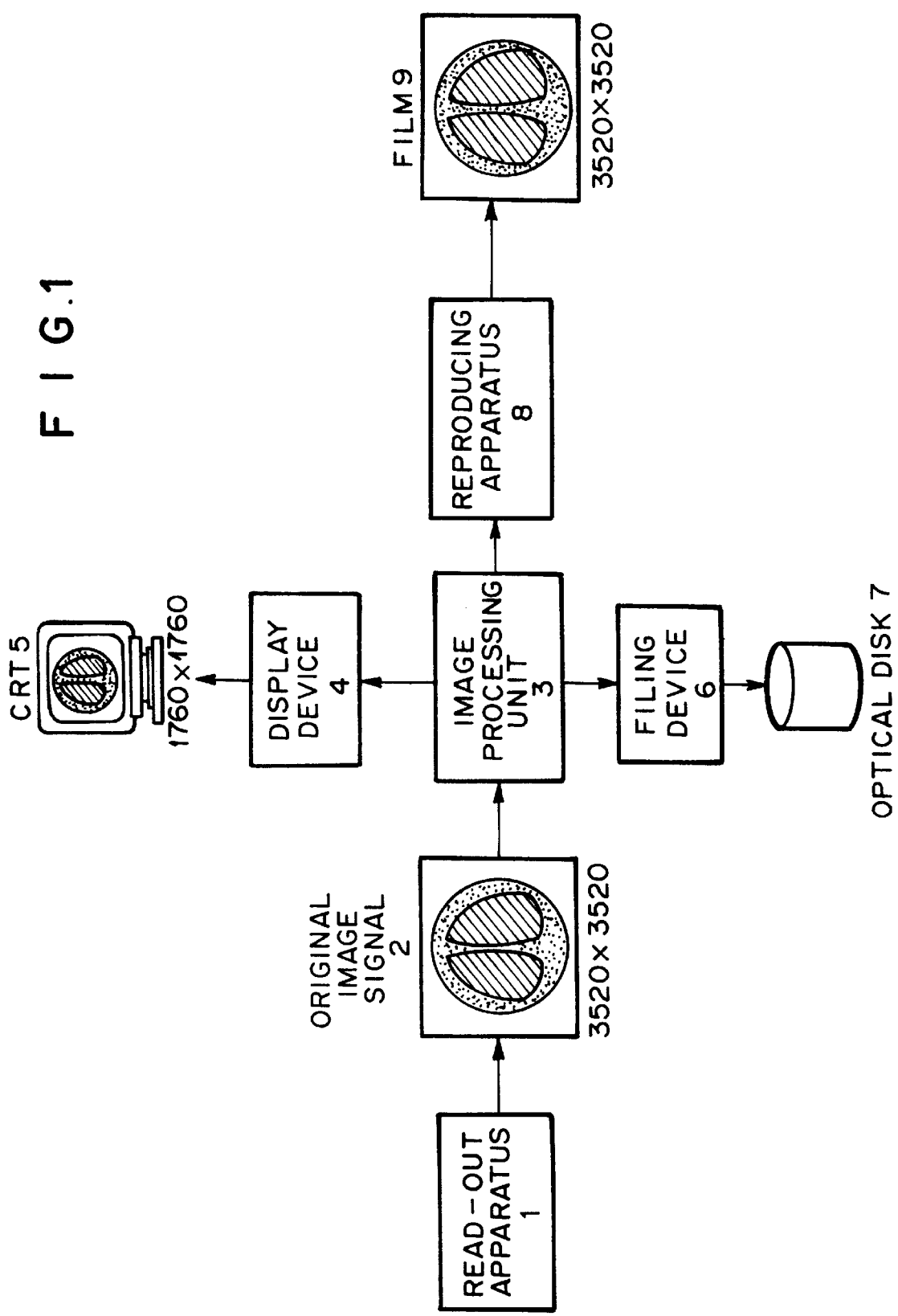
FIG. 1 is a block diagram showing an example of an image processing system for carrying out the image processing method in accordance with the present invention.

FIG. 1 shows an example of an image processing system for carrying out the image processing method in accordance with the present invention. With reference to FIG. 1, the image processing system comprises a read-out apparatus 1 for sampling an image signal, which has been obtained by scanning an original image, at a predetermined sampling density and digitizing the image signal. An original image signal 2 is thus obtained from the read-out apparatus 1. The image processing system also comprises an image processing unit 3 for carrying out image processing, such as a wavelet transform, on the original image signal 2, and a display device 4 for reproducing a visible image from the original image signal 2, which has been processed, and displaying the visible image on a CRT display device 5. The image processing system further comprises a filing device 6 for filing the processed original image signal on an optical disk 7, or the like, and a reproducing apparatus 8 for reproducing a visible image, which is represented by the processed original image signal, on a recording material, such as photographic film 9.

The original image signal 2 having been obtained from the read-out apparatus 1 is fed into the image processing unit 3 and is subjected to the wavelet transform. The wavelet transform carried out in the image processing unit 3 has three meanings. Firstly, the wavelet transform is carried out as one step in a signal compressing process for enhancing the efficiency, with which the signal storage medium for the filing is utilized. Of the image signal components of an image signal, important components are contained in a low frequency band, and high frequency components contain much unnecessary information, such as noise. Therefore, with the signal compressing process, a large storing region is allocated to the low frequency components of the image signal such that the information represented by the low frequency components may be stored accurately. Also, as for the high frequency components, a small storing region is allocated by, for example, decreasing the number of bits of each signal component. In this manner, the amount of information as a whole is decreased, i.e. the image signal is compressed. Specifically, in order for the compressing process to be carried out on the image signal, the image signal should firstly be classified into components of different frequency bands. The wavelet transform is employed as means for the classification.

Secondly, the wavelet transform is carried out as one step in the image processing, which is carried out such that the image reproduced as an image for diagnosis on the photographic film 9 may have good image quality and may be suitable for viewing in making a diagnosis. As the image processing carried out for such purposes, various techniques have heretofore been proposed. For example, with certain image processing techniques, predetermined frequency components of an image signal are eliminated, or the process is altered for different frequency components. In such cases, the wavelet transform may be utilized as means for classifying the image signal into different frequency components.

Thirdly, the wavelet transform is carried out as means for obtaining a reduced image. In general, the resolution of a CRT display device, or the like, is lower than the resolution of an image reproduced with a laser imager, or the like. In the example of FIG. 1, the resolution of the original image signal is equal to 3,520×3,520, and the resolution of the image reproduced on the photographic film 9 is equal to 3,520×3,520. However, the resolution of the CRT display device 5 is equal to 1,760×1,760. Therefore, in order for a visible image to be displayed on the CRT display device in an image processing system, which does not utilize the wavelet transform, a reduced image made up of 1,760×1,760 picture elements must be formed with a certain technique. On the other hand, with the image processing system, in which the wavelet transform is carried out, the image signal falling within a low frequency band represents a reduced image of the original image, and therefore the reduced image can be utilized directly as an image to be displayed on the CRT display device. Therefore, with the image processing system, in which the wavelet transform is carried out, the displaying on the CRT display device can be carried out with a smaller amount of processing than in the image processing system, in which the wavelet transform is not carried out.

The image signal, which has been obtained from the wavelet transform having the three meanings described above, is fed into the filing device 6, the reproducing apparatus 8, and the display device 4. In such cases, for example, the decrease in the amount of information, or the like, in the compressing process may be carried out by the image processing unit 3 or the filing device 6.

An example of how the wavelet transform is carried out by the image processing unit 3 will be described herein below with reference to FIG. 2. In this embodiment, the wavelet transform is carried out by conducting a filtering process on the original image signal and at intervals of a single picture element. The filtering process is carried out along each row and each column in the array of picture elements of the original image (i.e., along each of the main scanning direction and the subscanning direction, which were set in the operation for reading out the original image). At this time, filters having been designed in accordance with a basic wavelet function are employed. The filtering process is carried out step by step by using a plurality of filters and in accordance with the theory of the wavelet transform. (As for the theory of the wavelet transform and the technique for designing appropriate filters, reference may be made to the publications described above.)

Figure 2:
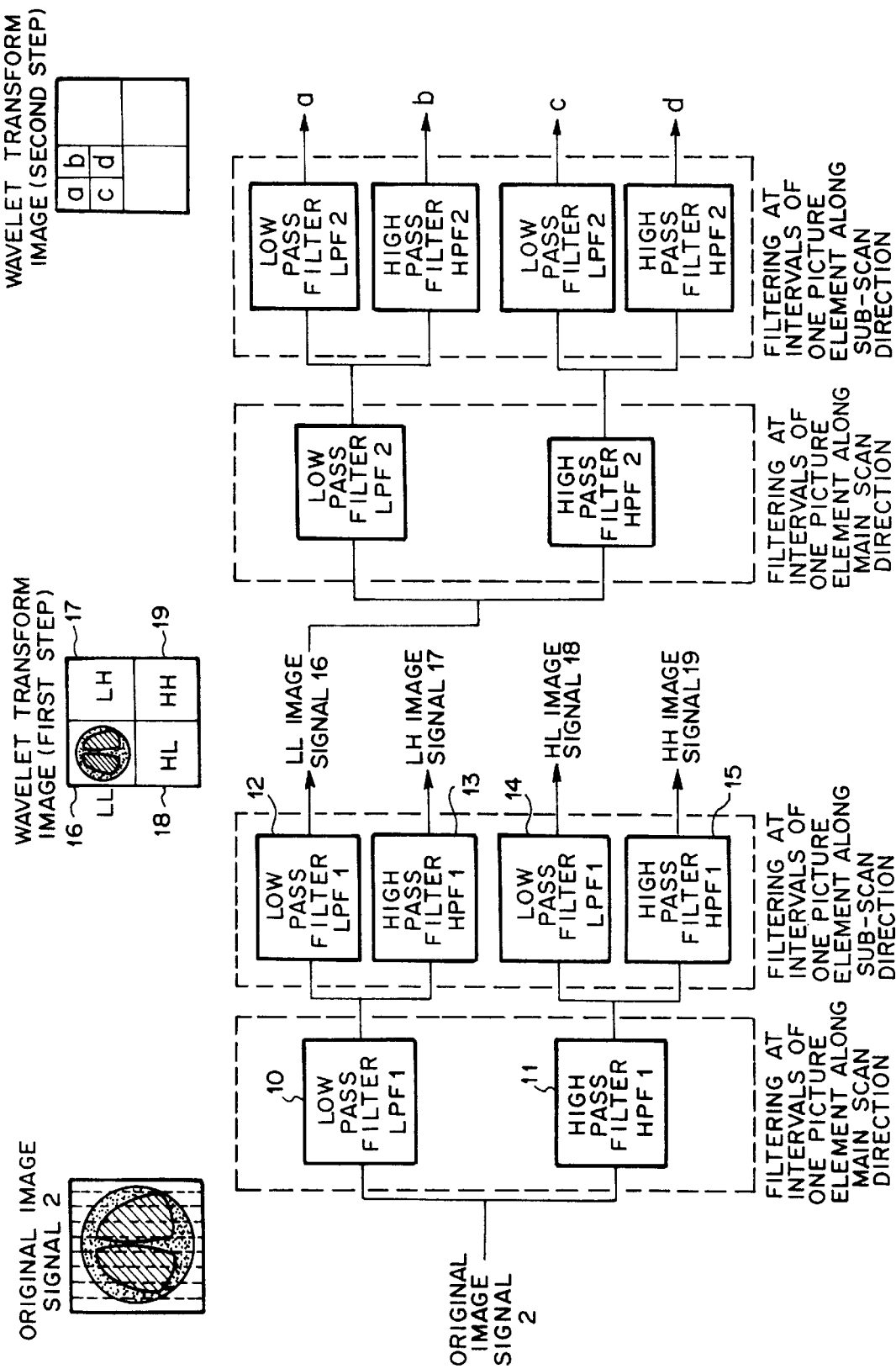
FIG. 2 is a block diagram showing an example of how a wavelet transform process is carried out.

As illustrated in FIG. 2, the original image signal 2 is processed at intervals of a single picture element along the main scanning direction by using each of a low pass filter 10 and a high pass filter 11. As a result, the original image signal having been processed with each filter is reduced to ½ along the main scanning direction.

The image signal, which has been obtained from the processing with the low pass filter 10, is then processed at intervals of a single picture element along the sub-scanning direction by using each of a low pass filter 12 and a high pass filter 13. As a result, an LL image signal 16 and an LH image signal 17 are obtained. Each of the LL image signal 16 and the LH image signal 17 has been reduced to ½ along each of the main scanning direction and the sub-scanning direction, i.e. represents an image having a size reduced to ¼ of the size of the original image. L is an acronym for the low pass filter, and H is an acronym for the high pass filter. LL represents the results obtained from the processing using the low pass filter along both of the main scanning direction and the sub-scanning direction. Also, LH represents the results obtained from the processing using the low pass filter along the main scanning direction and using the high pass filter along the sub-scanning direction.

Also, the image signal, which has been obtained from the processing with the high pass filter 11, is then processed at intervals of a single picture element along the sub-scanning direction by using each of a low pass filter 14 and a high pass filter 15. As a result, an HL image signal 18 and an HH image signal 19 are obtained. In this embodiment, the low pass filters 10, 12, and 14 are identical with one another. Also, the high pass filters 11, 13, and 15 are identical with one another. Alternatively, the low pass filters 10, 12, and 14 may be different from one another. Also, the high pass filters 11, 13, and 15 may be different from one another.

In this embodiment, the processes described above are repeated on the LL image signal 16, and the LL image signal 16 is further classified into frequency components. However, in order for the image processing method in accordance with the present invention to be carried out, it is only necessary that the LL image signal 16 be obtained. Therefore, the wavelet transform need not necessarily be carried out in many steps. The number of steps of the wavelet transform may be decided in accordance with the level of resolution necessary for the image to be displayed, i.e. the degree of reduction in image size, and other factors, such as the compressing process for the filing. In this embodiment, since the resolution of the CRT display device is equal to 1,760×1,760, the LL image signal 16, which is obtained from the single step of the wavelet transform, is utilized for displaying the image on the CRT display device.

In cases where the original image signal 2 is the one representing an image, in which predetermined periodical structure patterns are not embedded, the image processing system of the type described above can operate appropriately. However, in cases where the original image signal 2 is the one representing an image, which has been recorded by using a stationary grid, moire occurs in the image, which is reproduced from the LL image signal 16, due to the frequency corresponding to the periodical structure patterns of the stationary grid and the sub-sampling frequency. In this embodiment, in order for moire to be eliminated from the image reproduced from the LL image signal 16, i.e. the image displayed on the CRT display device, a filter capable of decreasing the frequency components corresponding to the periodical structure patterns of the stationary grid is employed as the low pass filters 10, 12, and 14.

Figure 3:
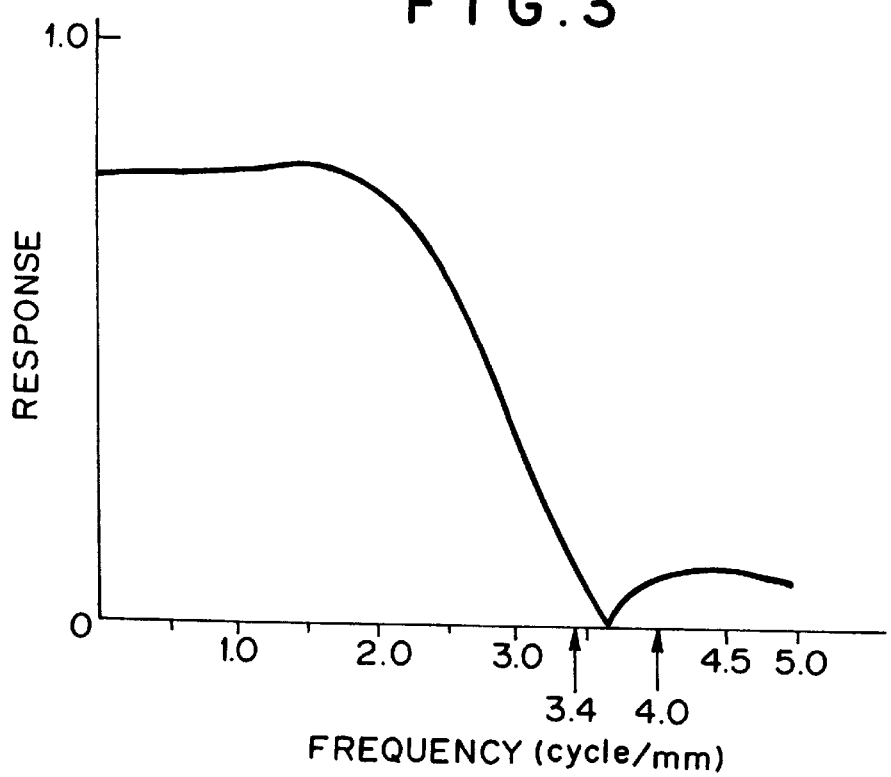
FIG. 3 is a graph showing an example of a low pass filter, which is used for a wavelet transform in the image processing method in accordance with the present invention.
Figure 4:
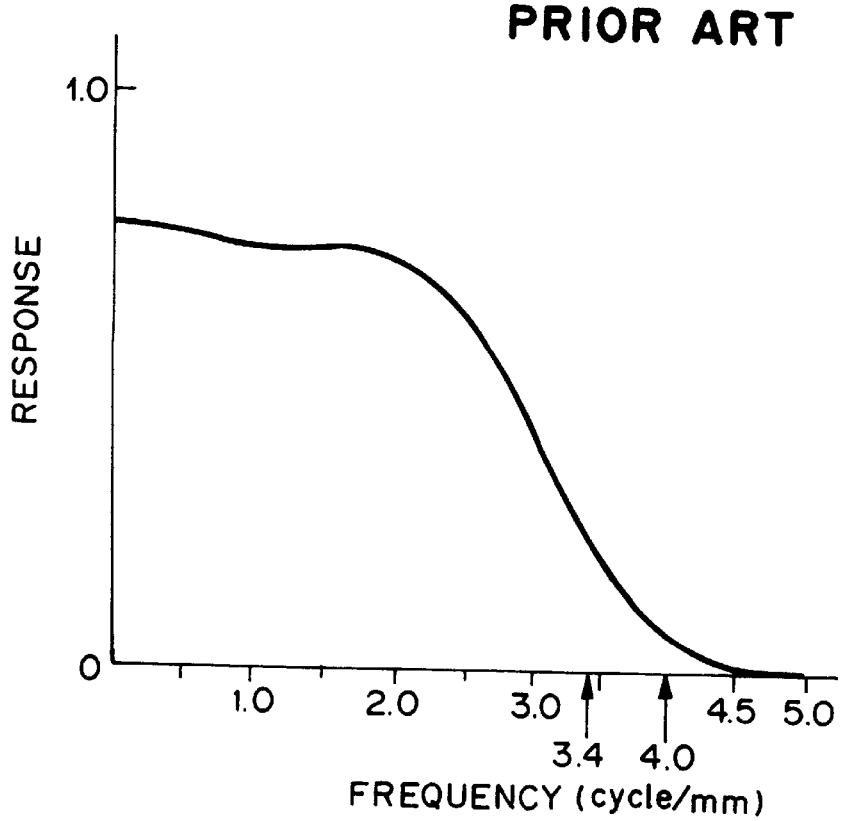
FIG. 4 is a graph showing an example of a low pass filter, which is used for a wavelet transform in a conventional image processing method.

FIG. 3 shows the response of the low pass filter for the wavelet transform, which has the moire eliminating functions. In FIG. 3, the frequency is plotted on the horizontal axis, and the response is plotted on the vertical axis. FIG. 4 shows the response of the conventional low pass filter for the wavelet transform, which does not have the moire eliminating functions. In FIGS. 3 and 4, the frequencies of 3.4 cycles/mm and 4.0 cycles/mm are the frequencies corresponding to stationary grids, which are utilized ordinarily. As illustrated in FIGS. 3 and 4, the filter of FIG. 3 has the characteristics such that the response with respect to the frequency of 3.4 cycles/mm may be markedly lower than in the filter of FIG. 4, and such that the response with respect to the frequency of 4.0 cycles/mm may be identical with the response of the filter of FIG. 4. Therefore, the filter of FIG. 3 can eliminate moire regardless of the type of the stationary grid used.

In cases where an image, which is obtained by carrying out the wavelet transform in many steps on the image signal, is to be displayed, the low pass filter having the characteristics shown in FIG. 3 may be employed in every step of the wavelet transform. Alternatively, the low pass filter having the characteristics shown in FIG. 3 may be employed in part of the steps of the wavelet transform, and a low pass filter having no moire eliminating function may be employed in the other steps of the wavelet transform.

As described above, with the image processing method in accordance with the present invention, the reduced image, which is obtained from the wavelet transform, can be utilized as the image, which is to be displayed, regardless of whether the stationary grid was or was not used in the image recording operation. Thus the image processing method in accordance with the present invention has large practical effects in that the reduced image obtained from the wavelet transform, which reduced image was merely the intermediate product occurring in the course of the frequency analysis processing in the past, can play a role as the image to be viewed and can thus be utilized efficiently. For example, it will be possible that the wavelet transform is used merely as means for enhancing the image quality or for compressing an image signal, and that a filtering process for obtaining an image suitable for the displaying on a CRT display device is carried out independently on the same image signal and a reduced image is thereby formed from the filtering process. However, with such a technique, a large memory capacity is required, and the processing speed cannot be kept high due to an increase in the number of processes. Specifically, with the image processing method in accordance with the present invention, the features of the wavelet transform can be utilized efficiently, and the reduced image to be viewed, which has good image quality, can be obtained with the minimum possible scale of means.

What is claimed is:

1. An image processing method for obtaining a reduced image to be viewed, comprising:

performing a wavelet transform on an image signal representing an image containing periodical structure patterns corresponding to a frequency higher than a Nyquist frequency in sub-sampling to obtain a reduced image which is represented by low frequency components of the image signal which are obtained from sub-sampling the image signal at predetermined sub-sampling intervals, wherein said wavelet transform is performed using at least one low pass filter which decreases the frequency components of said image signal which correspond to said periodical structure patterns and displaying the reduced image on a display device or reproducing the reduced image on a recording medium, wherein the image containing said periodical structure patterns is a radiation image having been recorded by using a stationary grid.

2. A method as defined in claim 1, further comprising quantizing high frequency components of the image signal, which are obtained from the wavelet transform together with the reduced image to be viewed, to reduce the amount of information of the high frequency components and thereby compress the image signal.

3. The image processing method as recited in claim 1, wherein said wavelet transform comprises:

processing said image signal using a first low pass filter, which decreases the frequency components corresponding to said periodical structure patterns contained in said image signal, at intervals of one picture element along a main scanning direction to obtain a first low pass filtered image signal which has been reduced along the main scanning direction; and processing the first low pass filtered image signal using a second low pass filter, which decreases the frequency components corresponding to said periodical structure patterns contained in said image signal, at intervals of one picture element along a sub-scanning direction to obtain a reduced image signal which has been reduced along the sub-scanning direction.

4. An image processing method for obtaining a reduced image to be viewed, comprising:

performing a wavelet transform on an image signal representing an image containing periodical structure patterns corresponding to a frequency higher than a Nyquist frequency in sub-sampling to obtain a reduced image which is represented by low frequency components of the image signal which are obtained from sub-sampling the image signal at predetermined sub-sampling intervals, wherein said wavelet transform is performed using at least one low pass filter which decreases the frequency components of said image signal which correspond to said periodical structure patterns and displaying the reduced image on a display device or reproducing the reduced image on a recording medium, wherein said periodical structure patterns are patterns of a stationary grid.

5. A method as defined in claim 1, wherein said step of performing a wavelet transformation on an image signal eliminates moire occurring in said reduced image caused by said periodical structure patterns in said image signal.

6. A method as defined in claim 4, wherein said step of performing a wavelet transformation on an image signal eliminates moire occurring in said reduced image caused by said periodical structure patterns in said image signal.

* * * * *